April 21, 1953     O. E. ANDRUS     2,636,137
DYNAMOELECTRIC APPARATUS AND METHOD OF MAKING THE SAME
Filed Jan. 21, 1948     2 SHEETS—SHEET 1
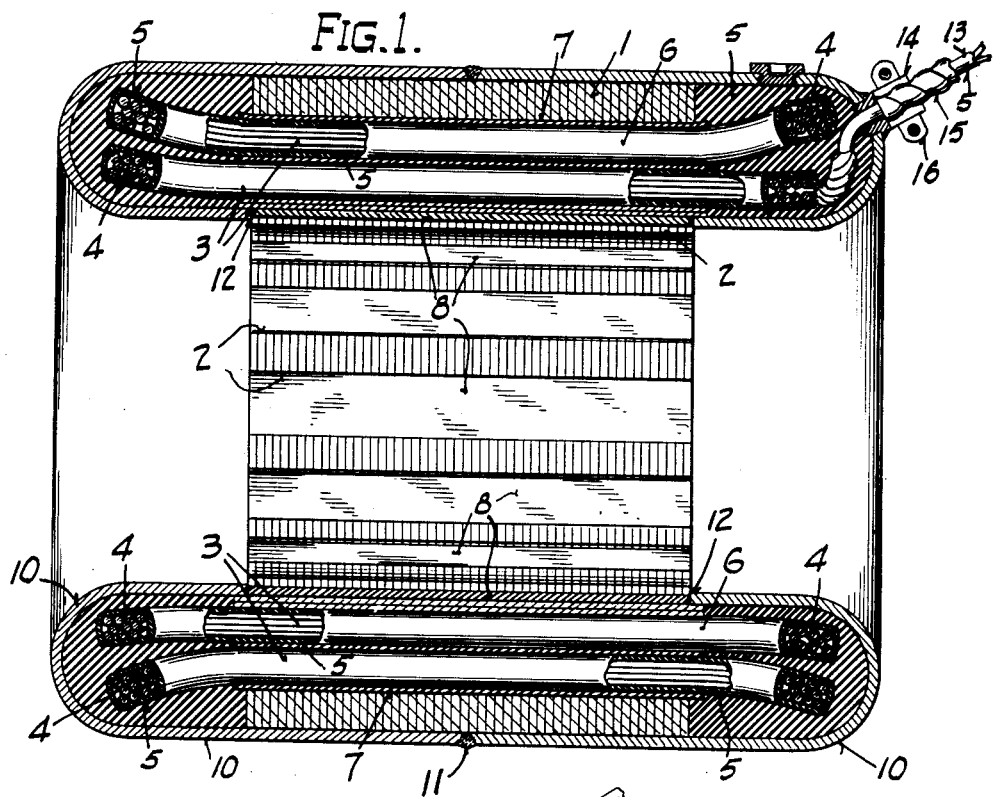
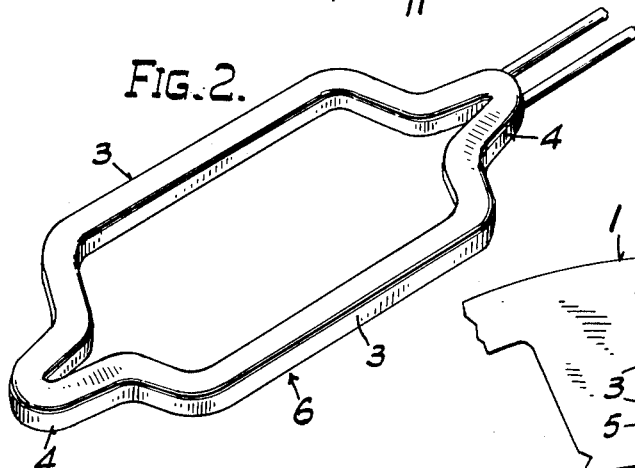
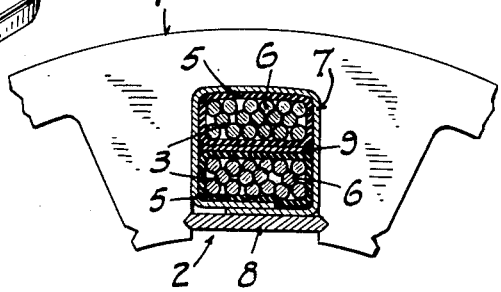
Orrin E. Andrus
INVENTOR.
BY *Edwin C. Andrus*
ATTORNEY.

April 21, 1953 O. E. ANDRUS 2,636,137
DYNAMOELECTRIC APPARATUS AND METHOD OF MAKING THE SAME
Filed Jan. 21, 1948 2 SHEETS—SHEET 2
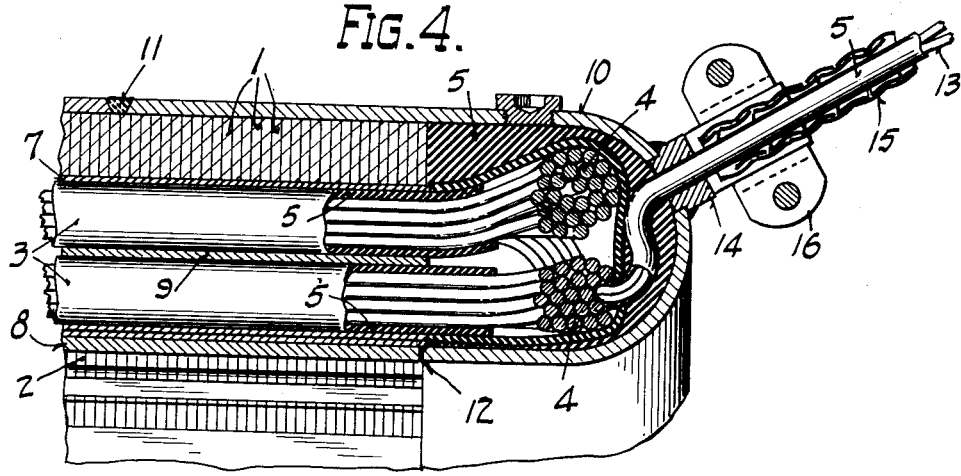
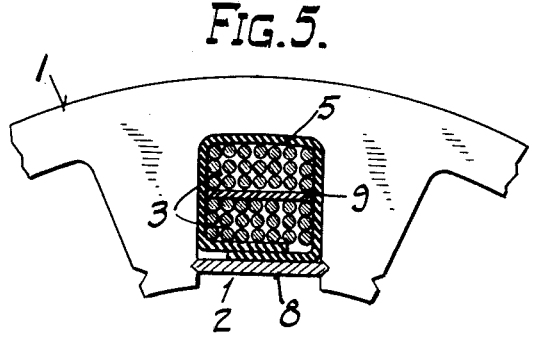
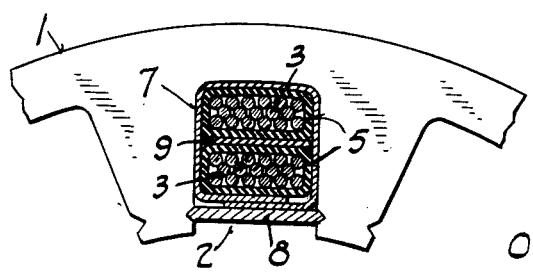
Orrin E. Andrus
INVENTOR.
BY
ATTORNEY.

Patented Apr. 21, 1953

2,636,137

UNITED STATES PATENT OFFICE 2,636,137

DYNAMOELECTRIC APPARATUS AND METHOD OF MAKING THE SAME

Orrin E. Andrus, Altadena, Calif., assignor to A. O. Smith Corporation, Milwaukee, Wis., a corporation of New York Application January 21, 1948, Serial No. 3,385

11 Claims. (Cl. 310—87)

This invention relates to a dynamo-electric apparatus and method of making the same, and has been applied particularly to the construction of a stator for an electric motor for use with pumps and the like where submergence of the motor in various fluids being pumped results in exposing the windings to injurious and undesirable conditions.

The motor insulation in environment of this nature must withstand heat, oil and moisture while effectively insulating the windings and must be heat-conductive and have elasticity to withstand shock or vibrations in service.

With these service requirements in mind the proposal of the invention is to sheath the windings and end coils of an electromagnetic device, such as a stator, in substantially pliable rubber and to confine the rubber by an enclosing shield of suitable material clamped over each end coil assembly of the stator and pulled up until the rubber is confined sufficiently to insure that substantially no voids exist within the casing.

Openings in the stator should be of such small cross-section that the rubber will close the openings and be prevented from excessively pushing out through the openings when the enclosure member is finally located.

Fluid in contact at the openings with the rubber only effects a swelling of the rubber a predetermined amount as the rubber is retained within the shield. A perfect seal of the windings results before failure of the rubber is reached.

By restraining the rubber against swelling a predetermined amount the rubber exposed through openings does not push out into the fluid in which the motor is operating and deteriorate and crumble off with consequent failure of the motor.

The principal object of the present invention is to provide electromagnetic apparatus that will not fail when exposed to water or mixtures of water and other liquids such as hydrocarbons, as in the case of gasoline containing moisture.

Another object is to provide an electromagnetic apparatus in which rubber sheathing on the windings is restrained against swelling over a predetermined amount upon contact with liquids to prevent electrical breakdown of the apparatus in service.

Another object is to provide a stator capable of use submerged in a liquid such as oil.

A further object is to provide a seal of longer life for motor windings.

A further object is to provide rubber sheathed stator windings under mechanical confinement of a nature that prevents deterioration of the rubber upon exposure.

A further object is to provide a method of sheathing motor windings in rubber and confining the same, that prevents deterioration of the rubber and seals the winding for use in oil and the like at operating temperatures.

Other objects and advantages of the invention will appear hereinafter in connection with the accompanying drawings in which:

Figure 1 is a longitudinal sectional view of a stator with form wound windings constructed in accordance with the invention;

Fig. 2 is a perspective view of a form wound coil;

Fig. 3 is a detailed enlarged section of one of the stator slots of Figure 1;

Fig. 4 is a detail section broken out of a stator and showing tubes enclosing the windings in a stator slot together with the joint between the tube and the rubber covering of the end coil and lead wires;

Fig. 5 is an enlarged section of a stator slot in which the conductors of the windings are sheathed in lapped rubber sheathing; and Fig. 6 is an enlarged section of a stator slot of Fig. 4.

Referring to the drawings, the dynamo-electric apparatus there shown to illustrate the invention comprises a stator formed of a plurality of stacked laminations 1 suitably held together. Each lamination is provided with the slots 2 at the inner periphery thereof and the slots of the respective laminations are longitudinally aligned to receive the stator windings 3 having the exposed coils 4 at the respective ends thereof.

The windings 3 within the body of the stator and the end coils 4 are completely surrounded or enveloped by a resilient material such as the rubber 5. The rubber may be applied to the windings and end coils by a number of different ways such as by wrapping, molding and the like or the stator may be constructed so that the windings can be inserted in a rubber tube.

Figure 1 illustrates a stator that has been provided with form wound windings, an individual coil 6 of which is shown in Fig. 2. The coil 6 comprises a plurality of wires suitably insulated from each other and wound or covered with rubber that has been vulcanized thereto. The rubber sheathes the conductors of the coil in a continuous fluid-tight rubber jacket.

Each coil 6 is shaped to form spaced parallel windings 3 connected by end coils 4. The windings 3 are disposed in slots 2 as illustrated in Figures 1 and 3 with the end coils 4 extending from each end of the laminations. There is no joint in the rubber 5 at the area where end coils 4 project from the windings. The rubber 5 extends over the conductors of the windings and onto the end coils in a continuous fluid-tight jacket.

Fig. 3 illustrates a slot 2 of the stator of Figure 1 with a winding 3 of a pair of form wound coils 6 assembled therein. The slot is of generally rectangular shape and is lined with a generally heavy paper liner sheet 7, or the like, which is lapped at the mouth of the slot. The slot stick 8 is disposed in a groove in the mouth of the slot to close the slot and hold the windings in place. A parting strip 9 may separate the conductors of windings 4 about midway of the slot.

Fig. 5 illustrates another manner of enclosing the windings. The rubber 5 is applied in sheet form and lines the wall of slot 2. The sheet is lapped at the base of the slot and held in place by the slot stick 8. The conductors of the windings 3 are separated by the parting strip 9 which is disposed approximately midway of the slot. The windings here are not form wound as in Figs. 1, 2, and 3, but the conductors thereof within slots 2 are suitably insulated and completely enveloped in the rubber 5.

The rubber 5 when applied in sheet form as illustrated in Fig. 5 may be either inserted in the longitudinal slots 2 before winding 3 is inserted therein, or it may be wrapped upon the winding and even vulcanized thereto before the winding 3 is inserted in slots 2. In any event the overlapping edges should be glued and cemented together with suitable cement. In some cases the rubber is vulcanized after the rubber sheath is applied.

Fig. 6 illustrates rubber 5 when in the form of a tube. A single tube of rubber may be employed, or as shown in Fig. 6, a pair of rubber tubes 5 may enclose an equal number of conductors of windings 3 within the slots 2. The rubber tubes 5 are separated by the parting strip 9, and the slot which is of generally rectangular shape is lined with liner sheet 7. The sheet 7 is lapped at the mouth of the slot 2 and held in place together with the windings 3 by the slot stick 8. Where tubes, such as those shown in Fig. 6, are employed the tubes are first placed in their respective slot and the conductors of the winding then drawn therethrough. The rubber tubes 5 completely envelop the windings 3 throughout the full length of the slots.

In the case of the form wound windings 3 illustrated by the coil 6 in Fig. 2, the conductors in the slots as well as the end coils 4 are completely enclosed in a continuous rubber jacket. In order to insure that there are no air spaces around the end coils additional rubber 5 is packed around the end coils 4 in sheet form or rubber may be extruded around the coils through the enclosing shield 10 after the latter has been applied. The shield 10 will be described more fully hereinafter.

In the case of the windings 3 illustrated in Figs. 4, 5 and 6, the end coils 4 and conductors are not initially covered with a continuous rubber jacket. With such windings after the conductors have been assembled within the slots, the end coils 4 are taped with rubber 5. This rubber 5 may be in sheet form or extruded rubber as previously described. Ordinarily the end coils 4 are taped with rubber and rubber may be packed between the wires or extruded in after shield 10 is applied.

Under this method of covering the end coils with rubber, the overlapping joint between the rubber 5 covering the conductors and rubber 5 enclosing the end coils should be glued or cemented together to avoid any possible leakage or failure. This is particularly so where the rubber is applied in sheet form. The cement should be chosen according to the rubber employed. Where natural rubber compounds are used the cement may be one that can be vulcanized in which case it becomes set by vulcanizing the parts under suitable pressures and at the required temperature.

The shield 10 is of cupped shape or of U cross-section and the respective end portions thereof are curved to fit closely around the end coils 4 and abut against the end of the stacked laminations 1 of the stator. The shield 10 is preferably formed of two similarly shaped members joined together at the inner end by the weld 11 circumferentially of the stator. The shield is of metal or other suitable material capable of withstanding the temperatures and liquids to which the stator will be subjected. It also has a physical strength to confine rubber.

The two halves of shield 10 are assembled over the respective end coils 4 and pulled together, until the rubber 5 surrounding the end coils is confined. The weld 11 then is made to join the parts of the shield 10 together.

Although the rubber 5 may be confined under pressure from shield 10, this is not essential if the rubber housing is initially fluid tight. Where the rubber 5 is continuous throughout the conductors and coils as in the case of form wound coil 6, the initial pressure need not be applied to the rubber by shield 10. Voids or air pockets should not be large enough to release the pressure upon swelling of the rubber and result in a deterioration of the rubber to a point of failure.

However, initial pressure from shield 10 should be employed if the rubber housing around the windings 3 and end coils 4 is formed fluid tight by pressure at the joints as ordinarily is the case with the windings and end coils illustrated in Figs. 4, 5 and 6. In the latter case the initial pressure applied by shield 10 should be sufficient to substantially eliminate voids.

In a cemented or vulcanized rubber sheath as in the case of form wound coils the shield 10 is assembled around the end coils in a manner to retain the rubber against swelling sufficiently to effect deterioration of the rubber and result in leakage of moisture through the rubber 5 to the wires. Here exertion of initial pressure on the rubber by shield 10 is optional.

In a mechanically-sealed rubber sheath, where cement and vulcanization may not be employed, sufficient initial pressure should be applied on rubber 5 by shield 10 to mechanically seal the joints in the rubber envelope against leakage of moisture to the wires.

The shield 10 is also preferably glued to the rubber 5 around the end coils with some form of rubber cement. A good method is to coat the rubber thickly with cement prior to applying the shields. Another method is to apply the shields 10 to the ends of the stator and then force a comparatively plastic rubber through an opening in each shield under sufficient pressure to completely fill all air spaces between the shield and the corresponding end coils 4, after which the rubber may be vulcanized. Pressure may be continued on the rubber mass through a suitable opening in the shield 10 during vulcanization to aid the vulcanizing process.

When the shield 10 is located in final position only a fine radial crack or opening 12 remains between each end of the shield and the corresponding end of the stator laminations. The radial openings 12 are closed by rubber 5 and the rubber does not normally extend through the cracks or openings 12. Rubber 5 completely fills all spaces within shield 10 so that there is substantially no air space therein.

With rubber 5 under confinement by shield 10 any liquid coming into contact with the rubber at the radial openings 12 merely effects a slight swelling of the rubber upon absorption of some of the liquid until further swelling is prevented by shield 10. The exposed rubber being fully retained or confined does not push out into liquid or atmosphere where it is subject to deterioration and crumbles off. The confined rubber provides a perfect seal for the windings and prevents injury thereto by oil, water and solvents at working temperatures.

Various types of leads may be employed with the invention. The drawings, Figure 1, illustrate one means of bringing in rubber covered leads 13 and confining both the rubber 5 of the leads and the stator so that the conductors thereof will be covered with a continuous fluid-tight rubber jacket that will not deteriorate from excessive absorption of rubber swelling fluids, such as mineral oils.

The shield 10 is provided with a split flange 14 around a suitable opening through which leads 13 covered with rubber 5 enter. The leads are applied to the end coil 4 before shield 10 is assembled therein.

The leads 13 are confined in the interlocking armour 15 which extends within flange 14. The inner surfaces of flange 14 may be shaped to conform with the surface of the armour. A split clamp 16 is disposed around flange 14 and held together by suitable bolts to force flange 14 against armour 15 and confine the rubber-covered lead from swelling any appreciable amount. The rubber 5 of leads 13 is cemented and vulcanized to the rubber 5 surrounding the end coils.

The invention provides a novel seal for motor windings. The expansion of the rubber beyond a predetermined amount upon absorption of some of the liquid with which it comes in contact is prevented by the enclosing shield 10 and the manner of confining leads 13. The rubber 5 at all times seals the windings against passage of moisture thereto and the rubber lasts indefinitely when retained against swelling even though exposed to hydrocarbons or other solvents in service.

The term "rubber" as employed herein has reference to synthetic and natural rubber and elastomers and includes natural rubber, polyvinyl chloride acetate resins, polyesters, organic polysulphides, butadiene styrene copolymers, and chloroprene polymers and the like.

Various embodiments of the invention may be employed within the scope of the accompanying claims.

I claim:

1. In electromagnetic apparatus having insulated windings adapted to be submerged in a fluid medium tending to act as a solvent to swell and break down the insulation, a relatively strong shield enclosing the insulation on said windings and fitting tightly around the same to confine the insulation, the insulation being of rubber and being cemented to eliminate joints therein, and said shield applying an initial pressure thereto to prevent injurious swelling and deterioration of the rubber upon contact with the fluid medium.

2. In electromagnetic apparatus having insulated windings adapted to be submerged in a fluid medium tending to act as a solvent to swell and break down the insulation, a relatively strong metal shield enclosing the insulation on said windings and fitting tightly around the same to confine the insulation, the insulation being of rubber and being substantially free from voids and air pockets so that said shield serves to prevent injurious swelling and deterioration of the rubber upon contact with the fluid medium.

3. In electromagnetic apparatus for use submerged in liquids and provided with stacked laminations having longitudinal slots therethrough, windings disposed in said slots, a resilient material capable of resisting moisture and high temperature disposed in said slots and enveloping said windings, similar resilient material covering the end turns of said windings, and a shield enclosing said windings and confining the resilient material under pressure with said material filling substantially all air spaces between the shield and windings.

4. In electromagnetic apparatus for use submerged in liquids and provided with stacked laminations having longitudinal slots therethrough, windings disposed in said slots and having exposed end coils, pliable rubber capable of resisting moisture and high temperature disposed in said slots and enveloping said windings, a shield enclosing said end coils, and pliable rubber surrounding said end coils and completely filling all spaces between the shield and coils, said rubber being adapted to expand a predetermined amount within the shield upon contact with fluid to seal all approaches to the windings.

5. In electromagnetic apparatus for use submerged in liquids and provided with stacked laminations having longitudinal slots therethrough, windings disposed in said slots and having exposed end coils, pliable rubber sheeting lining said slots and overlapped at the top of each slot to completely envelop said windings, a slot stick disposed in grooves across the top of each slot and confining the windings within the enclosing rubber sheeting, a shield enclosing said end coils, and pliable rubber surrounding said end coils and filling substantially all spaces between the shield and coils with the rubber under pressure from said shield, said rubber being adapted to expand a predetermined amount within the shield upon contact with fluid to seal all approaches to the windings.

6. In an electric motor adapted to be submerged in a deteriorating fluid medium, a plurality of stacked laminations, motor windings mounted in said laminations and having exposed end coils, insulating material disposed around said end coils in a substantially void-free manner, said insulating material being adapted to swell when contacted by said fluid medium, and a shield disposed tightly around said insulating material and having strength to prevent excessive swelling thereof, said shield having relatively small openings therearound to admit said fluid medium into contact with said insulating material and thereby effect swelling thereof into sealing engagement with said shield.

7. An electric motor stator adapted to be submerged in mineral oils and other fluid mediums having a tendency to swell and deteriorate rubber, comprising a stack of annular stator laminations, motor windings mounted in said laminations and having exposed coils at each end of said stack, rubber insulating material completely surrounding said exposed end coils in a manner to eliminate voids therearound, a pair of strong metal shields having generally U-shaped cross sections and disposed tightly over said rubber insulating material to confine the same against excessive swelling, one leg of each shield being disposed a slight distance from the corresponding end of said stack for admission of said fluid medium into contact with the rubber, the other leg of each shield being fitted over said stack and terminating adjacent the corresponding leg of the opposite shield, and a weld joining said corresponding last-named legs of said shields.

8. In electromagnetic apparatus adapted to be submerged in a fluid medium tending to act as a solvent to swell and break down the insulation, a plurality of windings, rubber insulation disposed around said windings in a substantially voidfree manner, and a shield enclosing said insulation and fitting tightly therearound, said shield being of sufficient strength to confine the insulation against any substantial swelling upon contact with the fluid medium in which the apparatus is employed.

9. In electromagnetic apparatus adapted to be submerged in a fluid medium, a plurality of windings having exposed end coils, resilient insulating material surrounding said end coils, and a shield enclosing the insulating material and end coils and fitting tightly therearound, said shield applying an initial pressure to the insulating material to substantially eliminate air pockets and voids inside the shield, and said insulating material being adapted to expand a predetermined amount within the shell upon contact with fluid medium to seal all approaches to the windings with increased pressure of the insulating material on the windings and shield as the insulating material expands in contact with said fluid medium.

10. The method of making electromagnetic apparatus having windings with exposed coils at opposite ends thereof, comprising enclosing said end coils with substantially pliable rubber, moving a pair of casing members into engagement with said rubber with sufficient pressure to eliminate air spaces and voids therein, and permanently securing said casing members in said pressure position to confine the rubber against excessive swelling upon contact with a deteriorating fluid medium.

11. The method of making electromagnetic apparatus having stacked laminations and longitudinal slots to receive windings having exposed end coils, the steps which comprise wrapping said windings in rubber sheeting to completely enclose the same, covering said end coils with rubber, inserting said wrapped windings in the slots but leaving the wrapped end coils exposed, moving a pair of casing members into engagement with said last-named rubber with sufficient pressure to eliminate air spaces and voids therein, and welding said casing members in said pressure position to confine the rubber against excessive swelling upon contact with a deteriorating fluid medium.

ORRIN E. ANDRUS.

References Cited in the file of this patent

UNITED STATES PATENTS

| Number | Name | Date |
|---|---|---|
| 1,425,308 | Woock et al. | Aug. 8, 1922 |
| 1,930,797 | Gold et al. | Oct. 17, 1933 |
| 2,124,610 | Dolgoff | July 26, 1938 |
| 2,428,816 | Sigmund et al. | Oct. 14, 1947 |

FOREIGN PATENTS

| Number | Country | Date |
|---|---|---|
| 283,921 | Great Britain | Sept. 20, 1928 |
| 451,776 | Great Britain | Aug. 11, 1936 |